Patented Nov. 2, 1948

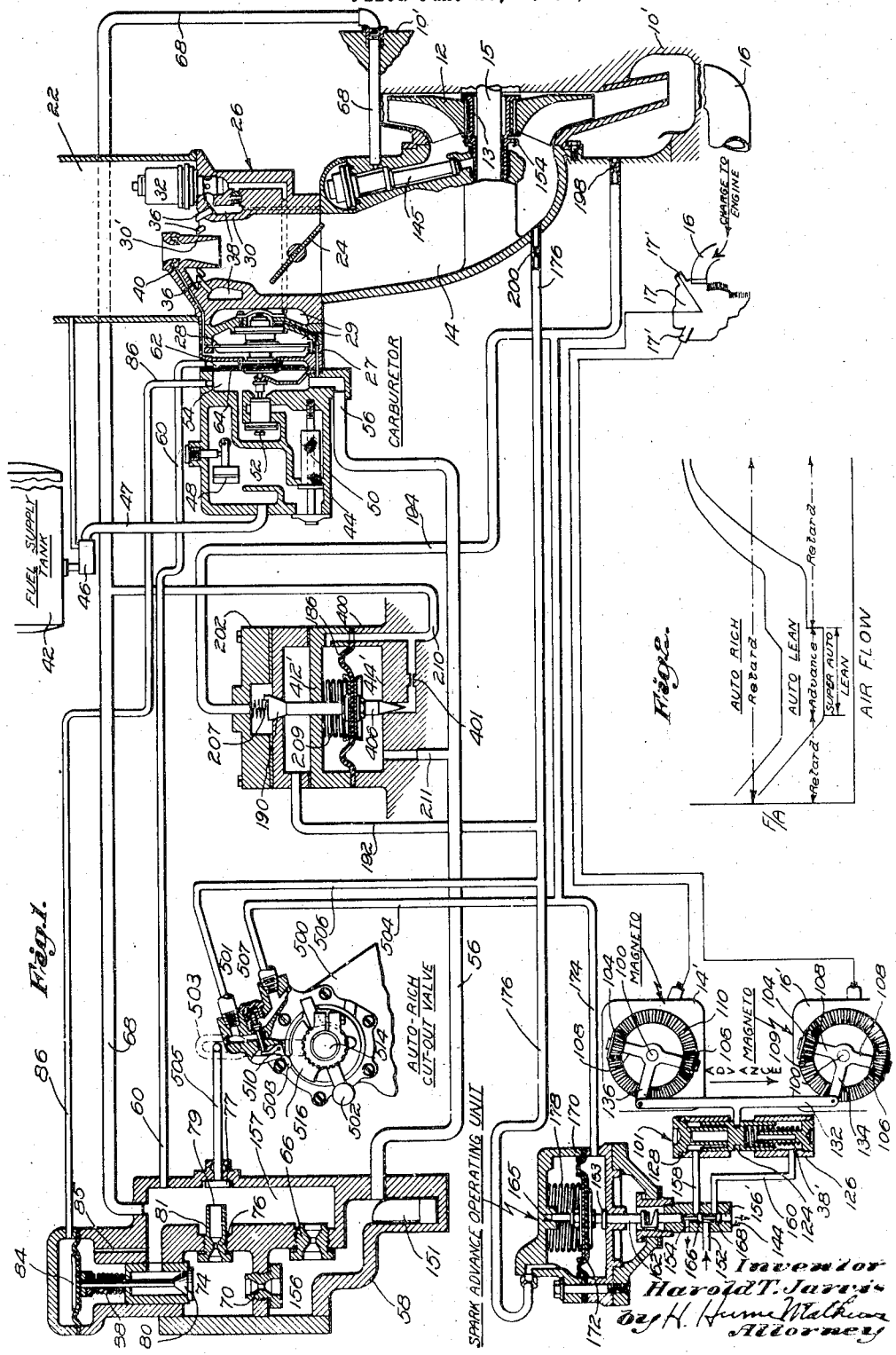

2,453,093

UNITED STATES PATENT OFFICE 2,453,093

FUEL AND IGNITION CONTROL

Harold T. Jarvis, Manchester, Conn., assignor to United Aircraft Corporation, East Hartford, Conn., a corporation of Delaware Application June 25, 1945, Serial No. 601,438

16 Claims. (Cl. 123—117)

This invention relates to the control of fuel and ignition systems for engines, particularly aircraft engines. This application is a continuation-in-part of co-pending Jarvis application Serial No. 481,114, filed March 30, 1943, now Patent No. 2,380,967, assigned to applicant's assignee.

An object of this invention is to provide improved means for regulating the mixture strength of an engine.

Another object is to provide means for correlating the ignition timing and the charge mixture strength of an engine.

Another object is to provide improvements in fuel and ignition control systems for internal combustion engines.

A further object is to provide a novel control device, particularly for internal combustion aircraft engines.

Other objects and advantages will be apparent from the specification and claims, and from the accompanying drawing which illustrates what is now considered to be a preferred embodiment of the invention.

In the drawing, Fig. 1 is a schematic view showing a fuel and ignition control apparatus constructed according to the teaching of this invention.

Fig. 2 shows schematically fuel-air ratio curves such as may be obtained with the control apparatus of Fig. 1.

The embodiment of the invention shown in the drawing is particularly adapted for use with aircraft engines having engine driven superchargers, but it is to be understood that the invention is not limited to such use.

Charge mixture strength, or fuel-air weight ratio, of an engine must be accurately controlled throughout the engine operating range in order to obtain maximum efficiency and fuel economy and other desirable engine operating characteristics. Spark advance, or the time at which ignition occurs with respect to piston position in a reciprocating internal combustion engine, must also be accurately controlled for the same reasons. For best results, the operation of these two controls should be correlated. An adjustment of either may affect engine operating characteristics such as the rate of burning of the charge, detonation, power output, fuel economy and engine temperature and therefore may require a corresponding adjustment of the other control to obtain optimum operating characteristics. Spark advance is usually expressed by the number of degrees of crankshaft rotation at which the spark plugs are fired before the piston reaches top dead center.

Mixture strength is usually expressed in pounds of fuel (such as gasoline) per pound of air in the engine charge.

According to this invention, both mixture strength and spark advance may be automatically regulated to predetermined different values under different engine operating conditions. Further, the mixture strength and spark advance may be correlated according to a predetermined relationship, to provide desirable engine operating characteristics under various operating conditions.

Referring to the embodiment of the invention selected for illustration in the drawings, a radial aircraft engine having air-cooled cylinders, one of which is shown at 17, is supplied with charging fluid (air or air and fuel) through induction pipes, one of which is shown at 16, by a main stage supercharger impeller 12 mounted in a supercharger or blower case, a portion of which is shown at 10'. The impeller is splined at 13 to a shaft 15 driven in a known manner by the engine crankshaft (not shown) through a speed increasing gear train or transmission (not shown), which may, for instance, be similar to those disclosed and claimed in Hobbs Patent No. 2,323,601, dated July 6, 1943 and in Hobbs-Willgoos application, Serial No. 492,423, now Patent No. 2,400,307, filed June 26, 1943, assigned to applicant's assignee.

Intake air is supplied to the supercharger inlet or throat 14 by a manifold 22 connected either directly to a scoop or ram positioned in the free airstream flowing over the aircraft or to the outlet of an auxiliary supercharger stage. The rate of flow by weight of intake air, and therefore engine power output, is controlled by throttle 24.

Air passing to the engine is measured by carburetor metering section 26 comprising main venturi 30, auxiliary venturi 30' and impact tubes 36, which cooperate to produce throat and scoop pressures in chambers 40 and 38, respectively.

These pressures, as corrected for variations in density by altitude compensator 32, are admitted to chambers 27, 29 on opposite sides of air diaphragm 28. The resultant force exerted by the diaphragm on fuel flow regulating valve 52 is a function of the rate of flow by weight of intake air and urges the valve toward open position.

Fuel is supplied to valve 52 by pump 46 from tank 42 through line 47 and strainer 50. A vapor trap including float valve 48 may be provided to eliminate gases from the liquid fuel, which is preferably gasoline.

Fuel in an amount controlled by valve 52 flows through unmetered fuel chamber 54 and line 56 to the fuel control body or metering jet section 58. After being metered in control body 58, the fuel passes through the metered fuel line 68 to the fuel discharge valve 145 and then into the fuel spinner 154 which sprays it into the air entering the vaned passages of impeller 12.

A fuel diaphragm 64 separates the unmetered fuel chamber 54 from a chamber 62, subjected by line 60 to the metered fuel pressure on the downstream side of the metering jets in the control 58. The resultant force exerted by this diaphragm on fuel valve 52 is dependent upon the fuel pressure drop across the metering jets, and urges the valve toward closed position. Fuel and air diaphragms 64, 28 and fuel valve 52 act to maintain a pressure drop across the metering jets between the unmetered and metered lines 56, 68 which is proportional to the compensated air pressure drop between the throat chamber 40 and the scoop chamber 38, thus regulating the rate of flow by weight of fuel to the engine in predetermined ratio to the rate of flow by weight of engine intake air, throughout the engine operating range.

This fuel-air ratio may be varied by controlling the jets in the fuel control body 58. The basic fuel-air ratio throughout the engine operating range is established by the main or cruise jet 66, which is continuously open. In addition to the flow through this jet, fuel may also flow from the unmetered jet chamber 156 through the economizer jet 70 into the chamber 74 and then through the auto-rich jet 76 into the metered jet chamber 157, when the auto-rich valve 77 is open as shown in Fig. 1. Jet 76 has a greater restriction than jet 70. Therefore, assuming valve 80 to be closed, the mixture is enriched by an amount determined substantially by the size of jet 76 when valve 77 is open.

It is desirable under high engine power output conditions to provide additional enrichment or higher mixture strengths to prevent detonation, and for other purposes. This is accomplished by economizer valve 80 operated by diaphragm 84 subjected to metered fuel pressure through passage 85 and unmetered fuel pressure through line 86. When the fuel pressure drop becomes sufficiently high, valve 80 is opened against the force of spring 88 to provide additional fuel in an amount determined by the value of the fuel pressure drop, the rate of spring 88 and the contour of valve 80, up to a maximum quantity determined by the size of economizer jet 70, which imposes a limit on the maximum flow permitted through both valve 80 and jet 76. Fuel enrichment occurs regardless of whether or not the carburetor is in the auto-rich position in which valve 77 is open, or in the auto-lean position in which valve 77 closes the opening 79 and thereby shuts off the flow of fuel through jet 76.

Idle valve 151, linked in a known manner with the throttle 24, is moved to a metering position, in which it restricts the flow from the end of unmetered fuel line 56 and thereby controls the mixture strength, when the throttle is closed and the engine is idling. When the throttle is open, idle valve 151 has no appreciable effect on the mixture strength.

According to the present invention, the above described fuel control apparatus, which is more fully disclosed in Palmer application Serial No. 529,104, filed April 1, 1944, assigned to applicant's assignee, is modified and correlated with the engine ignition control apparatus as follows.

An extra lean metering jet 401, controlled by a two-position auto-lean valve unit 400, is supplied with unmetered fuel from line 56 by passage 211. Fuel passing through jet 401 flows to metered fuel line 68 through passage 210, and from line 68 to the engine. Such flow through the "super" or extra lean jet 401 is controlled by valve 406. Flow through supplemental or auxiliary jet 401, when valve 406 is open, supplements flow through the metering jets in control body 58, to establish normal fuel-air ratios. When valve 406 closes, flow through jet 401 is cut-off and the normal mixture strength will be decreased by an amount determined by the flow capacity of jet 401.

Valve 406 is biased to closed position by a spring 209 and is opened by a predetermined pressure difference between the unmetered and metered fuel lines 56, 68. The stem of valve 406 is attached to the valve actuating diaphragm 186, which cooperates with the partition 412' and the wall 414' to form fluid tight chambers on opposite sides of the diaphragm. These chambers are subjected to metered and unmetered fuel pressures in lines 68, 56 by passages 210, 211, respectively. Diaphragm 186 actuates the fuel valve 406 and also actuates the by-pass or bleed valve 190 of the ignition system. Valve 190 is held in closed position by spring 207. This spring is preferably considerably weaker than the diaphragm spring 209 and serves merely to hold the stem of valve 190 in abutment with the diaphragm. When the pressure difference between fuel lines 56, 68 becomes sufficiently large, diaphragm 186 overcomes the force of spring 209 and moves upwardly to lift fuel valve 406 from its seat. The diaphragm in its upward movement also contacts the stem of valve 190 and opens this valve against the force of spring 207. Seals (or sealing diaphragms) may be provided if desired at the place where the stem of valve 190 passes through the partition 412'.

The engine ignition system comprises magnetos 14', 16' which supply ignition current at timed intervals to spark plugs 17' of the engine cylinders 17. The magnetos are driven from the engine crankshaft by gear trains including magneto drive gears 109, 110 in a manner more fully disclosed in Jarvis application Serial No. 481,114, filed March 30, 1943, to which reference is made for a more complete disclosure of the basic ignition system referred to herein.

For changing the timing of the magnetos, or the time at which ignition current is supplied to the spark plugs with respect to piston position, the magneto gear trains are each provided with bevel idler gears 104, 106 mounted on cages 108 rotatably supported on the magneto shafts 100, to which gears 109, 110 are fixed. Cages 108 are connected by arms 134, 136 to a cross bar or link 132 attached to the piston 124 of a servo motor 101. When pressure fluid such as oil is admitted to one or the other of cylinders 126, 128 of the servo motor the piston 124 will be reciprocated to move link 132 and retard or advance the ignition timing. A spring 38' biases piston 124 to retard position.

Servo motor 101 is controlled by a spark advance operating unit 144 including a servo valve 162 having lands 166, 168 which control the admittance of oil under pressure from the supply line 152 to the lines 158, 160 respectively attached to cylinders 128, 126. Drains 154, 156' are provided for relieving pressure in one cylinder as pressure fluid is admitted to the other.

Valve 162 is actuated by diaphragm 172 subjected to the pressure difference between fluid lines 174, 176, which are respectively connected through restriction 198 to the blower outlet and through restriction 200 to the blower inlet. Thus the chamber portion 170 of the spark advance operating unit is divided by diaphragm 172 into two fluid tight chambers connected to blower throat and blower rim.

A spring 178 maintains valve 162 in its downward or retard position, determined by the stop 163. When the force exerted by the fluid pressures on diaphragm 172 is sufficient to overcome the force of spring 178, valve 162 is moved upwardly to its advance position, determined by the abutment of the stop 165 against chamber 170.

Under some conditions it is desirable to maintain the spark retarded even when the supercharger pressure rise is sufficiently high to hold valve 162 in its upper or advance position. For this purpose by-pass valves 190 and 501 are provided. When either of these valves is opened, the effect is to bleed or by-pass air from the blower rim line 174 to the blower throat line 176. Restrictions 198, 200 are made of such value in relation to the size of valves 190, 501 that the opening of either of these valves will approximately equalize the pressure in lines 174, 176, thereby disabling the ignition timing mechanism, or rendering it ineffective to advance the spark, by causing the pressures on opposite sides of the diaphragm in chamber 170 to become substantially equalized and enabling spring 178 to maintain or return valve 162 to the retard position.

By-pass valve 190 of the spark advance control unit 202 is controlled by fuel head diaphragm 186. The force exerted by this diaphragm on the valve is determined by the fuel pressure drop which is in turn determined by the rate of flow by weight of engine intake air. Consequently diaphragm 186 will open valve 190 against the force of springs 209, 207 when intake airflow (and engine power output) reaches a predetermined value. Fuel valve 406 will of course be opened and closed simultaneously with ignition valve 190.

By-pass valve 501 in the mixture control 500 is actuated by handle 502. When the handle is moved to change the mixture setting of the carburetor, shaft 514, fixed thereto, is rotated to angularly adjust yoke 503 connected to valve lever 505, thereby shifting valve 77 to close or open the port 79. Movement of shaft 514 also angularly shifts a cam 516, keyed to the shaft, to close or open bleed valve 501 against the force of spring 507 by means of bell crank 508, fulcrumed at 510. The levers and cam are so arranged that whenever handle 502 is in the auto-rich position valves 77 and 501 are both open and when the handle is in auto-lean position valves 77 and 501 are both closed. A bleed or by-pass is established between lines 174, 176 through pipes 504, 506 when valve 501 is open. For a more detailed disclosure of the control 500 reference is made to Jarvis application Serial No. 601,436, now Patent No. 2,451,289, filed concurrently herewith, assigned to applicant's assignee.

*Operation*

As the throttle 24 is moved from idle position to the full open position the rate of intake airflow increases and the mixture strength and ignition timing are varied, for example as shown in Fig. 2.

As schematically shown in the upper (or auto-rich) curve of Fig. 2, with an auto-rich mixture setting (valve 77 open) the mixture strength decreases along the downwardly sloping line at the left of the curve from a rich idling mixture to a cruise mixture strength determined by the size of jets 66 and 76. The fuel-air ratio is then maintained substantially constant through a portion of the cruising power range during which valve 406 is closed, as shown by the left hand horizontal portion of the curve. When the rate of intake airflow reaches a predetermined value, which may be selected by spring 209, the fuel metering head becomes large enough to force diaphragm 186 upwardly, lifting valve 406 to increase the mixture strength as indicated by the upward step in the curve. The mixture strength will then again be held constant at the higher value, determined by the size of jets 66, 76 and 401, as shown by the right hand horizontal portion of the curve. It is further increased by the opening of economizer valve 80 when the power output enters the high or full power range, and the mixture is gradually enriched, as shown by the upwardly sloping line at the right of the curve, in accordance with each increase in power output beyond the cruising range. Because of the economizer or limiting jet 70, the fuel-air curve flattens out to a substantially constant value, as shown at the extreme upper right hand portion of the curve, when the engine approaches maximum power output.

Under auto-rich mixture conditions valve 501 is open and the pressures in lines 174, 176 are thereby equalized, enabling spring 178 to maintain the ignition timing in the normal or retard position regardless of variations in intake airflow, power output, or mixture strength.

With an auto-lean mixture setting (valve 77 closed) the fuel-air ratio follows the lower (or auto-lean) curve schematically shown in Fig. 2. The fuel-air ratio decreases as indicated by the sloping line at the left of the curve until the engine power output enters the cruising range. It then remains approximately constant at a value determined by the size of jet 66 through the major part of the range labeled "super auto-lean," during which valve 406 is held closed by spring 209. When the rate of intake airflow increases to a value sufficient to open valve 406 the mixture is enriched in an amount determined by the size of jet 401, as shown by the upward step in the curve at the right hand end of the "super auto-lean" range. The mixture strength will then again be held constant at a value determined by jets 66 and 401 until economizer valve 80 is opened to enrich the mixture in the high power range, as described above in connection with the auto-rich curve.

Valve 501 is closed when the valve 77 is closed and therefore the ignition timing will be advanced (for instance from 25° B. C. T. normal to 37° B. T. C. cruising spark advance position) when the mixture setting is auto-lean and the supercharger pressure rise becomes large enough to overcome the force of spring 178. An increase in intake airflow (and consequently engine power) also results in an increase in the pressure rise across the supercharger. When the pressure rise reaches a predetermined value (for instance about 3" Hg is suitable in some installations and about 8" Hg for some other installations) diaphragm 172 is forced upwardly to advance the ignition timing.

In Fig. 2 the point at which the blower pressure rise becomes sufficient to compress spring 178 and shift the timing to the advance position has been placed, for illustration, at the beginning of the cruising power range. The point at which the fuel metering head becomes sufficient to compress the spring 209 has been placed near the upper end of the cruising power range. With such an arrangement, the engine is operated with the spark retarded in the idling power range, with spark advanced in the "super" or extra-lean cruising range (valves 190, 406 closed) and with spark retarded in the lean cruise range (valves 190, 406 open) and the high power range (valve 80 partially or fully open). Thus the ignition timing and mixture strength may be automatically regulated, one in accordance with the other, when the mixture setting is auto-lean. With an auto-rich mixture setting, the ignition timing is maintained in the retard position and the fuel-air ratio is controlled independently of spark advance.

When the throttle is returned from the full open to the idle position the events described above will occur in reverse order, though preferably at slightly different values of intake airflow. Valves 190 and 406 may be so designed that the pressure differential across them tends to hold them closed, thereby insuring their shift to fully open position as soon as they are "cracked" or partially opened and preventing "hunting." In other words, the valves may be designed if desired to provide a hysteresis effect, so as to close only when the airflow decreases slightly below the value required to open the valves.

This invention may be used with the water injection apparatus of Palmer application Serial No. 529,104, referred to above, or with fuel injection systems in which the fuel is directly injected into the engine combustion chamber or chambers. The invention, of course, is not limited to the specific embodiment herein illustrated and described, but may be used in other ways without departure from its spirit as defined by the following claims.

I claim:

1. In an aircraft engine, a carburetor having metering means including a supplemental fuel jet for establishing predetermined normal fuel-air ratios, means for controlling the flow of fuel through said supplemental jet to decrease said normal fuel-air ratios, fluid pressure responsive means for actuating said controlling means to fully open said supplemental jet at a predetermined point within the intermediate portion of the engine power output range, and an engine control device actuated by said fluid pressure responsive means.

2. Engine fuel supply apparatus comprising at least two fuel metering devices, means for maintaining a controlled fuel pressure drop across said metering devices, a first valve responsive to said fuel pressure drop for controlling the flow of fuel through one of said devices, a second valve responsive to said fuel pressure drop for controlling the flow of fuel through the other of said devices, and means operatively associated with one of said valves for correlating the operation of an engine control device with the operation of said one valve.

3. The apparatus of claim 2, in which one of said valves is opened in response to an increase in said fuel pressure drop to a first predetermined value and the other of said valves is opened in response to a further increase in said fuel pressure drop to a second predetermined value.

4. In an engine, a pressure or injection type carburetor having economizer means, an extra-lean metering means separate from said economizer means, a first valve for controlling the flow of fuel through said extra-lean metering means, a second valve for regulating the operation of an engine control device, and means for simultaneously actuating said valves.

5. The combination of claim 4, in which said economizer means and said valves are controlled by a common fluid pressure source.

6. In a fuel supply apparatus for an aircraft engine having an air intake passage, means for maintaining a fuel pressure differential which varies in accordance with variations in the rate of flow by weight of air through said intake passage, a fuel control body subjected to said fuel pressure differential and having a continuously open metering means, a manually controlled metering means and an automatically controlled metering means therein, additional metering means subjected to said fuel pressure differential and actuated in accordance with variations in said fuel pressure differential, and engine control means operatively associated with said additional metering means.

7. In an aircraft engine, adjustable means for varying the charge mixture strength of said engine, and means responsive to variations in engine intake airflow and operatively associated with the ignition system of said engine for adjusting said adjustable means.

8. Engine ignition and fuel supply apparatus comprising, spark advancing means, fuel control means, and means for automatically disabling said spark advancing means in accordance with an operation of said fuel control means.

9. In an ignition and fuel control apparatus for an engine, a first valve for varying the ignition timing of said engine, a second valve for varying the charge mixture strength of said engine, and means for simultaneously actuating both of said valves in accordance with variations in engine intake airflow.

10. In an aircraft engine, an adjustable ignition timing device, an adjustable fuel-air ratio control device, and automatically operative means movable in one direction to simultaneously retard said ignition timing and increase said mixture strength and movable in another direction to simultaneously advance said ignition timing and decrease said mixture strength.

11. In an aircraft engine having a supercharger and having a supercharger rise actuated ignition timing mechanism and a fuel-air ratio control device, means for modifying the effect of said supercharger pressure rise upon said ignition timing mechanism, means for modifying the fuel-air ratio established by said control device, and automatically operative means for controlling said supercharger rise modifying means and said fuel-air ratio modifying means.

12. The apparatus of claim 11, in which said fuel-air ratio modifying means and said supercharger rise modifying means are controlled in accordance with variations in a fluid pressure differential that varies with variations in engine intake airflow.

13. In an aircraft engine having a supercharger, an ignition timing device, fluid passage means connected through fluid flow restrictions with the inlet and the outlet of said supercharger for actuating said ignition timing device, means for measuring the rate of intake airflow to said supercharger, a throttle valve between said airflow measuring means and said supercharger, means operatively associated with said airflow measuring means for establishing a fuel pressure differential which is a measure of the rate of intake airflow, means subjected to said fuel pressure differential for controlling the flow of fuel to said engine in predetermined relation to the flow of intake air, manually operated valve means for regulating said predetermined relation of fuel flow to air flow, ignition timing control means connected with said fluid passage means and with said manually operated valve means, ignition timing control means connected with said fluid passage means and with a diaphragm actuated by said fuel pressure differential, and a fuel flow control valve connected with said diaphragm.

14. In a method of operating an aircraft engine having fuel control means provided with rich and lean mixture settings, the steps of, regulating the mixture strength of the engine charge independently of the ignition timing of said engine during operation in said rich mixture setting, and simultaneously varying the mixture strength of the engine charge and the ignition timing of said engine during operation in said lean mixture setting.

15. In an ignition and fuel control apparatus for an engine, a first valve for varying the ignition timing of said engine, a second valve for varying the charge mixture strength of said engine, and pressure responsive means for simultaneously actuating both of said valves, said pressure responsive means being subjected to a fluid pressure differential which is a measure of the rate of flow by weight of engine intake air.

16. In an aircraft engine, an adjustable ignition timing device, an adjustable fuel-air ratio control device, means movable in one direction to simultaneously retard said ignition timing and increase said mixture strength and movable in another direction to simultaneously advance said ignition timing and decrease said mixture strength, and means for rendering said movable means ineffective to advance said timing under predetermined engine operating conditions.

HAROLD T. JARVIS.

REFERENCES CITED

The following references are of record in the file of this patent:

UNITED STATES PATENTS

| Number | Name | Date |
| --- | --- | --- |
| Re. 22,447 | Hersey | Feb. 29, 1944 |
| 2,217,364 | Halford et al. | Oct. 8, 1940 |
| 2,309,226 | Udale | Jan. 26, 1943 |
| 2,361,227 | Mock | Oct. 24, 1944 |
| 2,361,228 | Mock | Oct. 24, 1944 |
| 2,372,356 | Chandler | Mar. 27, 1945 |
| 2,394,664 | Chandler | Feb. 12, 1946 |